(12) United States Patent
Ravishankar et al.

(10) Patent No.: US 10,316,176 B2
(45) Date of Patent: Jun. 11, 2019

(54) POLYMER COMPOSITIONS AND METHODS OF MAKING THEM

(71) Applicant: ExxonMobil Chemical Patents Inc., Baytown, TX (US)

(72) Inventors: Periagaram S. Ravishankar, Kingwood, TX (US); Rainer Kolb, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/510,443

(22) Filed: Oct. 9, 2014

(65) Prior Publication Data

US 2015/0031831 A1    Jan. 29, 2015

Related U.S. Application Data

(63) Continuation-in-part of application No. 13/365,698, filed on Feb. 3, 2012, now Pat. No. 9,139,794.

(51) Int. Cl.
| | | |
|---|---|---|
| *C10L 1/16* | (2006.01) | |
| *C10M 111/04* | (2006.01) | |
| *C07F 5/04* | (2006.01) | |
| *C08L 23/14* | (2006.01) | |
| *C10M 143/00* | (2006.01) | |
| *C10M 143/08* | (2006.01) | |
| *C08L 23/08* | (2006.01) | |
| *C10M 143/04* | (2006.01) | |
| *C08L 23/16* | (2006.01) | |

(52) U.S. Cl.
CPC ........... *C08L 23/14* (2013.01); *C08L 23/0815* (2013.01); *C08L 23/16* (2013.01); *C10M 143/00* (2013.01); *C10M 143/04* (2013.01); *C10M 143/08* (2013.01); *C08L 2205/025* (2013.01); *C08L 2308/00* (2013.01); *C08L 2314/06* (2013.01); *C10M 2205/022* (2013.01); *C10M 2205/028* (2013.01); *C10M 2205/0285* (2013.01); *C10N 2220/021* (2013.01); *C10N 2220/033* (2013.01); *C10N 2270/00* (2013.01)

(58) Field of Classification Search
CPC . C10M 145/02; C10M 143/08; C10M 143/02
USPC ........................................ 508/131, 200, 591
See application file for complete search history.

(56) References Cited

U.S. PATENT DOCUMENTS

| | | |
|---|---|---|
| 3,778,375 A | 12/1973 | Braid et al. |
| 3,779,928 A | 12/1973 | Schlicht |
| 3,852,205 A | 12/1974 | Kablaoui et al. |
| 3,879,306 A | 4/1975 | Kablaoui et al. |
| 3,932,290 A | 1/1976 | Koch et al. |
| 3,933,659 A | 1/1976 | Lyle et al. |
| 4,028,258 A | 6/1977 | Kablaoui et al. |
| 4,105,571 A | 8/1978 | Shaub et al. |
| 4,176,074 A | 11/1979 | Coupland et al. |
| 4,344,853 A | 8/1982 | Gutierrez et al. |
| 4,464,493 A | 8/1984 | Joffrion |
| 4,542,199 A | 9/1985 | Kaminsky et al. |
| 4,752,597 A | 6/1988 | Turner |
| 4,871,705 A | 10/1989 | Hoel |
| 4,892,851 A | 1/1990 | Ewen et al. |
| 5,017,714 A | 5/1991 | Welborn, Jr. |
| 5,026,798 A | 6/1991 | Canich |
| 5,055,438 A | 10/1991 | Canich |
| 5,057,475 A | 10/1991 | Canich et al. |
| 5,068,047 A | 11/1991 | Chung et al. |
| 5,120,867 A | 6/1992 | Welborn, Jr. |
| 5,132,262 A | 7/1992 | Rieger et al. |
| 5,198,401 A | 3/1993 | Turner et al. |
| 5,243,001 A | 9/1993 | Winter et al. |
| 5,264,405 A | 11/1993 | Canich |
| 5,278,119 A | 1/1994 | Turner et al. |
| 5,278,264 A | 1/1994 | Spaleck et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,334,677 A | 8/1994 | Razavi et al. |
| 5,350,723 A | 9/1994 | Neithamer et al. |
| 5,387,568 A | 2/1995 | Ewen et al. |
| 5,391,617 A | 2/1995 | Olivier et al. |
| 5,391,629 A | 2/1995 | Turner et al. |
| 5,416,228 A | 5/1995 | Ewen et al. |
| 5,449,651 A | 9/1995 | Reddy et al. |
| 6,319,998 B1 | 11/2001 | Cozewith et al. |

(Continued)

FOREIGN PATENT DOCUMENTS

| | | |
|---|---|---|
| EP | 0 277 003 | 8/1988 |
| EP | 0 277 004 | 8/1988 |

(Continued)

OTHER PUBLICATIONS

U.S. Appl. No. 60/243,192, filed Oct. 25, 2000, Friedersdorf.

(Continued)

*Primary Examiner* — Prem C Singh
*Assistant Examiner* — Francis C Campanell

(57) ABSTRACT

The present disclosure is directed to polymer compositions that can be useful as viscosity modifiers, comprising (a) a first ethylene-α-olefin copolymer having an ethylene content of from about 60 to about 80 wt % and (b) a second ethylene-α-olefin copolymer having an ethylene content of from about 40 to about 60 wt %. The polymer composition comprises about 35 wt % to about 50 wt of the first ethylene-α-olefin copolymer and about 50 wt % to about 65 wt % of the second ethylene-α-olefin copolymer. The polymer compositions are made by comprising producing a first ethylene-α-olefin copolymer in a first reactor, directing the first copolymer to a second reactor, producing the second ethylene-α-olefin copolymer in the second reactor and forming the polymer composition.

17 Claims, No Drawings

(56) References Cited

U.S. PATENT DOCUMENTS

| | | |
|---|---|---|
| 7,402,235 B2 | 7/2008 | Huang |
| 2004/0034168 A1 | 2/2004 | Schauder |
| 2009/0036725 A1 | 2/2009 | Wu et al. |
| 2010/0273692 A1 | 10/2010 | Kolb et al. |
| 2010/0273693 A1* | 10/2010 | Datta .................. C08F 210/06 508/591 |

FOREIGN PATENT DOCUMENTS

| | | |
|---|---|---|
| EP | 0 426 637 | 5/1991 |
| EP | 0 427 697 | 5/1991 |
| EP | 0 495 375 | 7/1992 |
| EP | 0 500 944 | 9/1992 |
| EP | 0 520 732 | 12/1992 |
| EP | 0 570 982 | 11/1993 |
| EP | 0 573 403 | 12/1993 |
| EP | 0 612 768 | 8/1994 |
| EP | 0 638 611 | 2/1995 |
| WO | WO 92/00333 | 1/1992 |
| WO | WO 96/02244 | 2/1996 |
| WO | WO 2008/005100 | 1/2008 |
| WO | WO 2010/016847 | 2/2010 |
| WO | WO 2010/126720 | 11/2010 |
| WO | WO 2010/126721 | 11/2010 |
| WO | WO 2010/129151 | 11/2010 |
| WO | WO 2011/019474 | 2/2011 |
| WO | WO 2011/090859 | 7/2011 |
| WO | WO 2011/090861 | 7/2011 |
| WO | WO 2011/094057 | 8/2011 |
| WO | WO 2012/015572 | 2/2012 |
| WO | WO 2012/015573 | 2/2012 |
| WO | WO 2012/015576 | 2/2012 |
| WO | WO 2013/048690 | 4/2013 |
| WO | 2013/115912 A | 8/2013 |

OTHER PUBLICATIONS

U.S. Appl. No. 61/173,528, filed Apr. 28, 2009, Kolb et al.
Ewen et al., "*Syndiospecific Propylene Polymerizations with Group IVB Metallocenes*," J. Am. Chem. Soc., vol. 110 (18), 1988, pp. 6255-6256.

* cited by examiner

POLYMER COMPOSITIONS AND METHODS OF MAKING THEM

CROSS REFERENCE TO RELATED APPLICATIONS

This application is a continuation-in-part of U.S. patent application Ser. No. 13/365,698, filed Feb. 3, 2012, which claimed priority to the simultaneously-filed U.S. patent application Ser. No. 13/365,678, which was also filed on Feb. 3, 2012, the disclosures of which are incorporated herein by reference in its entirety.

TECHNICAL FIELD

The present disclosure relates to polymer compositions, which can be useful as viscosity index improvers in modifying the rheological properties of lubrication fluids, and methods of making such compositions.

BACKGROUND OF THE DISCLOSURE

Lubrication fluids are applied between moving surfaces to reduce friction, thereby improving efficiency and reducing wear. Lubrication fluids also often function to dissipate the heat generated by moving surfaces.

One type of lubrication fluid is petroleum-based lubrication oil used for internal combustion engines. Lubrication oils contain additives that help the lubrication oil to have a certain viscosity at a given temperature. In general, the viscosity of lubrication oils and fluids is inversely dependent upon temperature. When the temperature of a lubrication fluid is increased, the viscosity generally decreases, and when the temperature is decreased, the viscosity generally increases. For internal combustion engines, for example, it is desirable to have a lower viscosity at low temperatures to facilitate engine starting during cold weather, and a higher viscosity at higher ambient temperatures when lubrication properties typically decline.

Additives for lubrication fluids and oils include rheology modifiers, such as viscosity index (VI) improvers. VI improvers, many of which are derived from ethylene-alpha-olefin copolymers, modify the rheological behavior of a lubricant to increase viscosity and promote a more constant viscosity over the range of temperatures at which the lubricant is used. Higher ethylene content copolymers efficiently promote oil thickening and shear stability. However, higher ethylene content copolymers also tend to aggregate in oil formulations leading to extremely viscous formulations. Aggregation typically happens at ambient or subambient conditions of controlled and quiescent cooling. This deleterious property of otherwise advantageous higher ethylene content viscosity improvers is measured by low temperature solution rheology. Various remedies have been proposed for these higher ethylene content copolymer formulations to overcome or mitigate the propensity towards the formation of high viscosity at low temperature.

It is believed that the performance of VI improvers can be substantially improved, as measured by the thickening efficiency (TE) and the shear stability index (SSI), by appropriate and careful manipulation of the structure of the VI improver. For examples, compositions of blends of amorphous and semi-crystalline ethylene-based copolymers have been used. Traditionally, such copolymer compositions are made from mixing two polymers made from conventional vanadium based Ziegler-Natta catalyst in an extruder or solvent based process. See, e.g., U.S. Pat. Nos. 7,402,235 and 5,391,617, and European Patent 0638611A1.

Similar polymer compositions made with metallocene catalyzed ethylene-α-olefin copolymers can have a tendency to form gels in lubricating oils when stored at low temperatures. Such gelation of metallocene catalyzed copolymers can be observed visually when lubricating oil solutions or poly-alpha olefin (PAO) solutions containing the polymers are cycled from −15° C. to 10° C. or, alternatively, in a low temperature rheological test, where the yield stress and tan δ are measured. Yield stresses in the range of from 0 MPa to 4000 MPa are observed for metallocene catalyzed polymers in PAO solutions containing a 2.4 wt % polymer concentration at 0° C. and −15° C. and generally scale with the severity of the gels as rated by the visual gel test method. Further, values of the tan δ scale inversely with the tendency of the solutions to form gels, higher values indicating higher tendency to form non-gelling lubricating oils.

There is still a need for processes for making polymer compositions suitable for use as viscosity index improvers for lubricating oils which exhibit little or no gelation at low temperatures.

Additional references include PCT Publication Nos. WO2008/005100A1, WO2010/016847A1, WO2010/126720A1, WO2010/126721A1, WO2010/129151A1, WO2011/019474A1, WO2011/090859A1, WO2011/090861A1, WO2011/094057A1, WO2012/015572A1, WO2012/015573A1, WO2012/015576A1, and WO2013/048690A1.

SUMMARY OF THE DISCLOSURE

The present disclosure relates to polymer compositions which are useful as viscosity modifiers. The polymer compositions may be made by a method comprising the steps of (i) feeding a first ethylene monomer, a first propylene monomer, a first solvent, and a first metallocene catalyst to a first reactor to form a first effluent comprising a first ethylene-propylene copolymer, (ii) feeding the first effluent from the first reactor, a second ethylene monomer, a second propylene comonomer, a second solvent, and optionally a second metallocene catalyst to a second reactor to form a second effluent comprising the first ethylene-propylene copolymer and a second ethylene-propylene copolymer, (iii) devolatizing the second effluent to form a concentrated polymer stream comprising a molten polymer composition and less than 1 wt % solvent, and (iv) pelletizing the molten polymer composition to form the polymer composition. The first ethylene-propylene copolymer may comprises from about 60 wt % to about 85 wt % ethylene-derived units and from about 15 wt % to about 40 wt % propylene-derived units, and have a MFR of greater than 10 g/10 min. The second ethylene-propylene copolymer can comprise from about 40 wt % to about 60 wt % ethylene-derived units and from 40 wt % to about 60 wt % propylene-derived units. The polymer composition may comprise from about 35 wt % to about 50 wt % of the first ethylene-propylene copolymer and from about 50 wt % to about 65 wt % of the second ethylene-propylene copolymer, and comprises 50 wt % to 70 wt % ethylene-derived units.

In some embodiments, the polymer composition comprises (a) a first ethylene-propylene copolymer comprising from about 60 wt % to about 85 wt % ethylene-derived units and from about 15 wt % to about 40 wt % propylene-derived units, wand having an MFR of greater than 10 g/10 min, a weight-average molecular weight (Mw) of less than about 70,000, and a crystallinity at 25° C. of less than 5%; and (b)

a second ethylene-propylene copolymer comprising from about 40 wt % to about 60 wt % ethylene-derived units and from about 40 wt % to about 60 wt % propylene-derived units, and having an MFR of at least 2 g/10 min, a weight-average molecular weight (Mw) of less than 130,000, and a crystallinity at 25° C. of less than 5%. The polymer composition preferably comprises from about 35 wt % to about 50 wt % of the first ethylene-propylene copolymer and about 50 wt % to about 65 wt % of the second ethylene-propylene copolymer; and comprises from about 50 wt % to about 70 wt % ethylene-derived units.

In some embodiments, a PAO solution at 2.4 wt % concentration of the polymer composition has a δ of greater than about 75°, evaluated at an angular frequency of 1 rad/s applying 0.2 Pa oscillatory stress at 1° C./min heating rate from temperature of −18° C. to 40° C., where the tan δ is a ratio of Loss Modulus to Storage Modulus.

Still other objects and advantages of the present disclosure will become readily apparent by those skilled in the art from the following detailed description, wherein it is shown and described only the preferred embodiments, simply by way of illustration of the best mode. As will be realized, the disclosure is capable of other and different embodiments, and its several details are capable of modifications in various obvious respects, without departing from the disclosure. Accordingly, the description is to be regarded as illustrative in nature and not as restrictive.

DETAILED DESCRIPTION OF THE INVENTION

The present disclosure relates to polymer compositions comprising different ethylene-α-olefin copolymers that can be useful as a viscosity index improver in modifying the rheological properties of lubrication fluids. The polymer compositions are formed from at least two ethylene-α-olefin copolymers having different ethylene contents.

In one embodiment, the polymer composition comprises a first ethylene-α-olefin copolymer and a second ethylene-α-olefin copolymer. The first ethylene-α-olefin copolymer has relatively higher ethylene content (as compared to the second ethylene-α-olefin copolymer) and the second ethylene-α-olefin copolymer has relatively lower ethylene content (as compared to the first ethylene-α-olefin copolymer).

In particular, the polymer compositions of the present disclosure comprise (a) a first ethylene-α-olefin copolymer and (b) a second ethylene-α-olefin copolymer. The first ethylene-α-olefin copolymer (a) has an ethylene content from about 60 wt % to about 85 wt %, more typically, from about 60 wt % to about 80 wt %, or from about 65 wt % to about 75 wt %, or from about 67 to about 73 wt %, based upon the weight of the first ethylene-α-olefin copolymer. In preferred embodiments, the first ethylene-α-olefin copolymer comprises, or consists essentially of, ethylene-derived units and propylene-derived-units. Thus, in preferred embodiments the first ethylene-α-olefin copolymer is an ethylene-propylene copolymer and comprises from about 60 wt % to about 85 wt %, or from about 65 wt % to about 75 wt %, or from about 67 wt % to about 73 wt %, ethylene-derived units and from about 15 wt % to about 40 wt %, or from about 25 wt % to about 35 wt %, or from about 27 wt % to about 33 wt %, propylene-derived units.

The second ethylene-α-olefin copolymer (b) has an ethylene content of from about 40 wt % to about 60 wt %, more typically from about 40 wt % to about 50 wt %, or from about 43 wt % to about 49 wt %, or from about 43 wt % to about 47 wt %, based upon the weight of the second ethylene-α-olefin copolymer. In preferred embodiments, the second ethylene-α-olefin copolymer comprises, or consists essentially of, ethylene-derived units and propylene-derived-units. Thus, in preferred embodiments the second ethylene-α-olefin copolymer is an ethylene-propylene copolymer and comprises from about 40 wt % to about 60 wt %, or from about 40 wt % to about 50 wt %, or from about 43 wt % to about 49 wt %, ethylene-derived units and from about 40 wt % to about 60 wt %, or from about 50 wt % to about 60 wt %, or from about 51 wt % to about 57 wt %, propylene-derived units.

The polymer composition comprises from about 35 wt % to about 50 wt %, or from about 40 wt % to about 50 wt %, or from about 43 wt % to about 47 wt % of the first ethylene-α-olefin copolymer (or the first ethylene-propylene copolymer); and from about 50 wt % to about 65 wt %, or from about 50 wt % to about 60 wt %, or from about 53 wt % to about 57 wt %, of the second ethylene-α-olefin copolymer, based upon the total weight of the first and second ethylene-α-olefin copolymers.

In some embodiments, at least one of the first and second ethylene-α-olefin copolymers can have a Melt Flow Rate (MFR), measured by ASTM D 1238 condition L (230° C./2.16 kg), of at least about 2 g/10 min, or at least 3 g/10 min., or at least about 3.5 g/10 min, or at least 4 g/10 min. In some embodiments the MFR may be less than 10 g/10 min, or less than 7 g/10 min, or less than 6 g/10 min, or less than 5 g/10 min.

In some embodiments, the first ethylene-α-olefin copolymer (or the first ethylene-propylene copolymer) has a MFR of greater than about 10 g/10 min, or greater than 11 g/10 min, or greater than 12 g/10 min, or greater than 13 g/10 min. The first ethylene-α-olefin copolymer (or the first ethylene-propylene copolymer) may have a MFR of less than 30 g/10 min, or less than 27 g/10 min, or less than 25 g/10 min, or less than 23 g/10 min, or less than 21 g/10 min. In some embodiments, the first ethylene-α-olefin copolymer (or the first ethylene-propylene copolymer) can have a MFR of from about 10 g/10 min to about 30 g/10 min, or from about 12 g/10 min to about 25 g/10 min.

In some embodiments, the polymer composition has a MFR of at least 3 g/10 min, or at least 4 g/10 min, or at least 5 g/10 min, and less than 20 g/10 min, or less than 15 g/10 min, or less than 10 g/10 min.

In some embodiments, the first ethylene-α-olefin copolymer can have a Melt Flow Rate Ratio (MFRR), defined as the ratio of the MFR measured at 230° C./21.6 kg to the MFR measured at 230° C./2.16 kg, of greater than 24, and more typically up to about 55, or from about 28 to about 45, or from about 30 to about 34.

In some embodiments, the first copolymer may have a corrected MFRR (cMFRR) of from about 24 to about 55, or from about 28 to about 45, or from about 30 to about 34. The corrected MFRR can be calculated in accordance with the equation: cMFRR=MFR*(target MFR/MFR)$^{-0.198}$, wherein the target MFR is from 3.0 g/10 min to 4.5 g/10 min, for example, 4.0 g/10 min.

In some embodiments, the polymer compositions may have a Melt Flow Rate Ratio (MFRR), defined as the ratio of the melt flow ratio measured at 230° C./21.6 kg to the melt flow ratio measured at 230° C./2.16 kg, of greater than about 24. In a particular embodiment, the polymer composition has a MFRR of about 28 to about 38 and preferably from about 30 to about 35.

In some embodiments, the polymer compositions may have a corrected MFRR (cMFRR) of from about 24 to about 55, or from about 28 to about 38, or from about 30 to about 35. The corrected MFRR can be evaluated in accordance with the equation: cMFRR=MFRR*(target MFR/MFR)$^{-0.198}$, wherein the target MFR is from 3.0 g/10 min to 4.5 g/10 min, for example, 4.3 g/10 min.

The weight average molecular weight (Mw) of the first ethylene-α-olefin copolymer can be less than about 70,000 g/mol and in some embodiments is in the range of about 60,000 g/mol to about 70,000 g/mol. The Mw of the second ethylene-α-olefin copolymer can be less than about 130,000 g/mol, and in some embodiments in the range of from about 100,000 to about 130,000 g/mol or in the range of from about 105,000 to about 130,000 g/mol. The Mw of the polymer composition can be from about 60,000 g/mol to about 120,000 g/mol in one embodiment, or from about 70,000 g/mol to about 110,000 g/mol, or from about 75,000 g/mol to about 100,000 g/mol, or from about 80,000 to about 100,000 g/mol.

The molecular weight distribution (MWD) of each of the first and second ethylene-α-olefin copolymers can typically be less than about 2.5, and more typically about 2.1 to about 2.4.

In one embodiment, the polymer compositions typically have a total ethylene content of about 50 wt % to about 70 wt %, or about 50 wt % to about 65 wt %, or about 50 wt % to about 60 wt %.

The first ethylene-α-olefin copolymer (or the first ethylene-propylene copolymer) preferably has a crystallinity at 25° C. (as measured by x-ray diffraction) of less than 5%, or less than 3%, or less than 2%, or less than 1%. In some embodiments, the first ethylene-α-olefin copolymer exhibits no discernable crystallinity and exhibits zero crystallinity.

The second ethylene-α-olefin copolymer (or the second ethylene-propylene copolymer) preferably has a crystallinity at 25° C. (as measured by x-ray diffraction) of less than 5%, or less than 3%, or less than 2%, or less than 1%. In some embodiments, the second ethylene-α-olefin copolymer exhibits no discernable crystallinity and exhibits zero crystallinity.

The polymer composition preferably has a crystallinity at 25° C. (as measured by x-ray diffraction) of less than 5%, or less than 3%, or less than 2%, or less than 1%. In some embodiments, the polymer composition exhibits no discernable crystallinity and exhibits zero crystallinity.

In one or more embodiments, when the polymer composition is added into a PAO solution at a 2.4 wt % concentration, the PAO solution can have a δ of 75° or greater, or greater than 78°, or greater than 85°, evaluated by an oscillatory rheology test, which includes at an angular frequency of 1 rad/s applying 0.2 Pa oscillatory stress at 1° C./min heating rate during the temperature from −18° C. to 40° C., where the tan δ is a ratio of Loss Modulus to Storage Modulus.

In one or more embodiments, when the polymer composition is added into a PAO solution at a 2.4 wt % concentration, the PAO solution can typically have a δ of 75° or greater, or greater than 80°, or greater than 85°, evaluated by an oscillatory rheology test, which includes at an angular frequency of 1 rad/s applying 0.2 Pa oscillatory stress at 1° C./min cooling rate during the temperature from 40° C. to −18° C., where the tan δ is a ratio of Loss Modulus to Storage Modulus.

In one or more embodiments, when the polymer compositions is added into a PAO solution at a 2.4 wt % concentration, the PAO solution can typically have a difference in the δ evaluated at the heating step and the cooling step of less than 10°, or less than 5°.

The performance of the polymer compositions as viscosity index (VI) improvers can be represented by the thickening efficiency (TE) and the shear stability index (SSI) of an lubricating oil solution that comprises the polymer composition, particularly by the TE at a given SSI. In preferred embodiments, the polymer composition exhibits an SSI of from about 20 to 30, or from about 21 to 28. In preferred embodiments, the polymer composition exhibits a TE of less than 3, or from about 1.5 to 3, or from about 1.7 to 2.5, or from about 1.8 to about 2.3. The TE and SSI can be measured by blending 1.5 wt % of the polymer composition with a Group I base oil solution having a kinematic viscosity of 6.06 cSt at 100° C.

As used herein, the term "copolymer" includes any polymer having two or more monomers.

As used herein, the term "MWD" means the molecular weight distribution, or ratio of weight-average molecular weight (Mw) to number-average molecular weight (Mn).

As used herein, the term "Wt % $C_2$" means the weight percent of ethylene-derived units in an ethylene-based copolymer based on the weight of the second ethylene-based copolymer. As used herein, an "ethylene-based" copolymer, such as the first ethylene-α-olefin copolymer, is not required to have a minimum ethylene content (e.g., at least 50 wt. %), unless expressly stated otherwise herein.

For purposes of this specification and the claims appended thereto, when a polymer or copolymer is referred to as comprising an α-olefin, including, but not limited to ethylene, propylene, and butene, the olefin present in such polymer or copolymer is the polymerized form of the olefin. For example, when a copolymer is said to have an "ethylene" content of about 60 wt % to about 80 wt %, it is understood that the mer unit in the copolymer is derived from ethylene in the polymerization reaction and said derived units are present at about 60 wt % to about 80 wt %, based upon the weight of the copolymer.

Method of Making the Polymer Composition

Polymer compositions according to the present invention are preferably prepared by a method comprising forming the first ethylene-α-olefin copolymer in a first polymerization reactor; forming the second ethylene-α-olefin copolymer in a second polymerization reactor in series with the first polymerization reaction zone; and forming the polymer composition comprising the first and second ethylene-α-olefin copolymer.

In some embodiments, a method of making the polymer composition comprises the steps of:

(i) feeding a first ethylene monomer, a first α-olefin comonomer, a first solvent, a first metallocene catalyst in a first reactor to form an effluent comprising a first ethylene-α-olefin copolymer; wherein the first ethylene-α-olefin copolymer has an ethylene content from about 60 wt % to about 80 wt % based upon the weight of the first ethylene-α-olefin copolymer;

(ii) directing the effluent to a second reactor;

(iii) feeding a second ethylene monomer, a second α-olefin comonomer, a second solvent, and optionally a second metallocene catalyst in the second reactor to form a second ethylene-α-olefin copolymer; wherein the second ethylene-α-olefin copolymer has an ethylene content of about 40 wt % to about 60 wt % based upon the weight of the second ethylene-α-olefin copolymer; and (iv) forming the polymer composition comprising the first and second ethylene-α-olefin copolymers; wherein the polymer composition comprises from about 35 wt % to about 50 wt % of the first ethylene-α-olefin copolymer and about 50 wt % to about 65 wt % of the second ethylene-α-olefin copolymer based upon the total amount of the first and second ethylene-α-olefin copolymers.

In some embodiments, a method of making the polymer composition comprises the steps of:

(i) feeding a first ethylene monomer, a first propylene monomer, a first solvent, and a first metallocene catalyst to a first reactor to form a first effluent comprising a first ethylene-propylene copolymer, where the first ethylene-propylene copolymer comprises from about 60 wt % to about 85 wt % ethylene-derived units and from about 15 wt % to about 40 wt % propylene-derived units, and where the first ethylene-propylene copolymer has a MFR of greater than 10 g/10 min;

(ii) feeding the first effluent from the first reactor, a second ethylene monomer, a second propylene comonomer, a second solvent, and optionally a second metallocene catalyst to a second reactor to form a second effluent comprising the first ethylene-propylene copolymer and a second ethylene-propylene copolymer, where the second ethylene-propylene copolymer comprises from about 40 wt % to about 60 wt % ethylene-derived units and from 40 wt % to about 60 wt % propylene-derived units;

(iii) devolatizing the second effluent to form a concentrated polymer stream comprising a molten polymer composition and less than 1 wt % solvent; and (iv) pelletizing the molten polymer composition to form the polymer composition, where the polymer composition comprises from about 35 wt % to about 50 wt % of the first ethylene-propylene copolymer and from about 50 wt % to about 65 wt % of the second ethylene-propylene copolymer, and where the polymer composition comprises 50 wt % to 70 wt % ethylene-derived units.

In some embodiments, a hydrogen feed can be added to the first reactor and/or the second reactor. The concentration of the hydrogen feed can be less than about 1 wt %, or less than about 0.5 wt %, or less than 0.1 wt %, based on the total weight of the fresh feeds of the hydrogen (if any), ethylene monomer, α-olefin comonomer, and solvent fed into the reactor. The concentration in the first reactor can be same as or different from that in the second reactor.

The first and second ethylene-α-olefin copolymer can be polymerized in solution. The viscosity of the solution during polymerization can be less than 10000 cPs, or less than 7000 cPs, and preferably less than 500 cPs. The reactor is preferably a liquid filled, continuous flow stirred tank reactor providing full back mixing for random copolymer production.

Reactors can be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid.

Reactor temperature can be selected depending upon the effect of temperature on catalyst deactivation rate and polymer properties and/or extent of monomer depletion. Therefore, reaction temperature can be determined by the details of the catalyst system.

In general, the first reactor in a series can be operated at a reactor temperature from about 0° C. to about 200° C., or from about 80° C. to about 180° C., or from about 100° C. to about 150° C. Preferably, reaction temperatures are from about 100° C. to about 150° C. or from about 110° C. to about 150° C. The second reactor temperature can vary from about 40° C. to about 200° C., with about 50° C. to about 150° C. preferred, and about 100° C. to about 150° C. more preferred. Ranges from any of the recited lower limits to any of the recited upper limits are contemplated by the inventors and within the scope of the present description. In copolymerization techniques that utilize one or more bis-Cp catalysts with one or more mono-Cp catalysts, a lower reaction temperature is preferred for reactions utilizing mono-Cp catalyst when compared to the bis-Cp catalyst.

Reaction pressure is determined by the details of the polymer recovery system. In general each of the first and the second reactor can operates at a reactor pressure of less than 2500 pounds per square inch (psi) (17.23 MPa), or less than 2200 psi (15.16 MPa) or less than 2000 psi (13.78 MPa). Preferably, reactor pressure is from about atmospheric pressure to about 2000 psi (13.78 MPa), or from about 200 psi (1.38 MPa) to about 2000 psi (13.78 MPa), or from about 300 psi (2.07 MPa) to about 1800 psi (12.40 MPa). Ranges from any of the recited lower limits to any of the recited upper limits are contemplated and within the scope of the present description.

In the case of less stable catalysts, catalyst can also be fed to a second. Optimal temperatures can be achieved by using bis-cyclopentadienyl catalyst systems containing hafnium as the transition metal, especially those having a covalent, single atom bridge coupling the two cyclopentadienyl rings.

Particular reactor configurations and processes suitable for use in the processes described herein are described in detail in U.S. Pat. No. 6,319,998 and U.S. Provisional Patent Application having Ser. No. 60/243,192, filed Oct. 25, 2000, which are incorporated by reference herein. Branching can be introduced by the choice of polymerization catalysts or process.

In alternative embodiments, the first and second ethylene-based copolymers can be polymerized in an alkane solvent, such as hexane (or isomers of hexane) in a solution process or propylene in a slurry process and finished to remove the solvent. The first and second ethylene-based copolymers can have a medium viscosity and a molecular weight in excess of that needed in the final lubricant formulation.

Comonomers

Suitable comonomers include, but are not limited to, propylene ($C_3$) and other alpha-olefins, such as $C_4$ to $C_{20}$ alpha-olefins (also referred to herein as "α-olefins"), and preferably propylene and $C_4$ to $C_{12}$ α-olefins. The α-olefin comonomer can be linear or branched, and two or more comonomers can be used, if desired. Thus, reference herein to "an alpha-olefin comonomer" includes one, two, or more alpha-olefin comonomers.

Examples of suitable comonomers include propylene, linear $C_4$ to $C_{12}$ α-olefins, and α-olefins having one or more $C_1$ to $C_3$ alkyl branches. Specific examples include: propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include: propylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with methyl substituents on any of $C_3$ to $C_5$, 1-pentene with two methyl substituents in any stoichiometrically acceptable combination on $C_3$ or $C_4$, 3-ethyl-1-pentene, 1-octene, 1-pentene with methyl substituents on any of $C_3$ or $C_4$, 1-hexene with two methyl substituents in any stoichiometrically acceptable combination on $C_3$ to $C_5$, 1-pentene with three methyl substituents in any stoichiometrically acceptable combination on $C_3$ or $C_4$, 1-hexene with an ethyl substituent of $C_3$ or $C_4$, 1-pentene with an ethyl substituent of $C_3$ and a methyl substituent in a stoichiometrically acceptable position of $C_3$ or $C_4$, 1-decene, 1-nonene, 1-nonene with a methyl substituent on any of $C_3$ to $C_9$, 1-octene with two methyl substituents in any stoichiometrically acceptable combination of $C_3$ to $C_7$, 1-heptene with three methyl substituents in any stoichiometrically acceptable combination of $C_3$ to $C_6$, 1-octene with an ethyl substituent on any of $C_3$ to $C_7$, 1-hexene with two ethyl substituents in any stoichiometrically acceptable combination of $C_3$ or $C_4$, and 1-dodecene. More preferably, the comonomer in each copolymer is propylene, butene, hexene, octene or mixtures thereof.

Catalysts

The terms "metallocene" and "metallocene catalyst," as used herein, refer to compounds possessing a transition metal M, with cyclopentadienyl (Cp) ligands, at least one non-cyclopentadienyl-derived ligand X (e.g., a leaving group), and zero or one heteroatom-containing ligand Y, as shown in the formula under type (2), the ligands being coordinated to M and corresponding in number to the valence thereof. The metallocene catalyst precursors are generally neutral complexes but when activated with a suitable co-catalyst yield an active metallocene catalyst, which refers generally to an organometallic complex with a vacant coordination site that can coordinate, insert, and polymerize olefins. The metallocene catalyst is preferably one of, or a mixture of metallocene compounds, of either or both of the following types:

(1) cyclopentadienyl (Cp) complexes that have two Cp ring systems for ligands. The Cp ligands form a sandwich complex with the metal and can be free to rotate (unbridged) or locked into a rigid configuration through a bridging group. The Cp ring ligands can be like or unlike unsubstituted, substituted, or a derivative thereof, such as a heterocyclic ring system, which may be substituted, and the substitutions can be fused to form other saturated or unsaturated rings systems, such as tetrahydroindenyl, indenyl, or fluorenyl ring systems. These cyclopentadienyl complexes have the general formula:

$$(Cp^1R^1_m)R^3_n(Cp^2R^2_p)MX_q$$

where $Cp^1$ of ligand $(Cp^1R^1_m)$ and $Cp^2$ of ligand $(Cp^2R^2_p)$ are the same or different cyclopentadienyl rings; $R^1$ and $R^2$ each is, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; and two $R^1$ and/or $R^2$ substituents on adjacent carbon atoms of the cyclopentadienyl ring associated there with can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; q is equal to the valence of M minus 2; and (2) monocyclopentadienyl complexes that have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof, such as a heterocyclic ring system which may be substituted, and the substitutions can be fused to form other saturated or unsaturated ring systems, such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula:

$$(Cp^1R^1_m)R^3_n(YR^2_y)MX_s$$

wherein $R^1$ is, each independently, a halogen or a hydrocarbyl, halocarbyl, hydrocarbyl-substituted organometalloid or halocarbyl-substituted organometalloid group containing up to about 20 carbon atoms; m is 0 to 5; and two $R^1$ substituents on adjacent carbon atoms of the cyclopentadienyl ring associated therewith can be joined together to form a ring containing from 4 to about 20 carbon atoms; $R^3$ is a bridging group; n is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group VA or a coordination number of two from group VIA preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and when Y is three coordinate and unbridged there may be two R groups on Y each independently a radical selected from a group consisting of $C_1$ to $C_{20}$ hydrocarbon radicals, substituted $C_1$ to $C_{20}$ hydrocarbon radicals, where one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; s is equal to the valence of M minus 2; and y is 1 if Y is a heteroatom containing group in which the heteroatom is an element with a coordination number of three from Group VA, and y is 0 if Y is a heteroatom containing group in which the heteroatom is an element with a coordination number of two from group VIA.

Examples of suitable biscyclopentadienyl metallocenes of the type described in group 1 above can be as discussed and described in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, which are incorporated by reference herein.

Illustrative, but not limiting, examples of preferred biscyclopentadienyl metallocenes of the type described in group 1 are the racemic isomers of:

μ-$(CH_3)_2$Si(indenyl)$_2$M(Cl)$_2$;
μ-$(CH_3)_2$Si(indenyl)$_2$M(CH$_3$)$_2$;
μ-$(CH_3)_2$Si(tetrahydroindenyl)$_2$M(Cl)$_2$;
μ-$(CH_3)_2$Si(tetrahydroindenyl)$_2$M(CH$_3$)$_2$;
μ-$(CH_3)_2$Si(indenyl)$_2$M(CH$_2$CH$_3$)$_2$; and
μ-$(C_6H_5)_2$C(indenyl)$_2$M(CH$_3$)$_2$;

wherein M is chosen from a group consisting of Zr and Hf.

Examples of suitable unsymmetrical cyclopentadienyl metallocenes of the type described in group 1 are disclosed in U.S. Pat. Nos. 4,892,851; 5,334,677; 5,416,228; and 5,449,651; and are described in publication *J. Am. Chem. Soc.* 1988, 110, 6255, all of which are incorporated by reference herein for purposes of U.S. patent practice.

Illustrative, but not limiting, examples of preferred unsymmetrical cyclopentadienyl metallocenes of the type described in group 1, where X=R, are:

μ-$(C_6H_5)_2$C(cyclopentadienyl)(fluorenyl)M$(R)_2$;
μ-$(C_6H_5)_2$C(3-methylcyclopentadienyl)(fluorenyl)M$(R)_2$;
μ-$(CH_3)_2$C(cyclopentadienyl)(fluorenyl)M$(R)_2$;
μ-$(C_6H_5)_2$C(cyclopentadienyl)(2-methylindenyl)M$(R)_2$ where R preferably is $CH_3$;
μ-$(C_6H_5)_2$C(3-methylcyclopentadienyl)(2-methylindenyl)M$(R)_2$ where R preferably is Cl;
μ-$(C_6H_5)_2$C(cyclopentadienyl)(2,7-dimethylfluorenyl)M$(R)_2$; and
μ-$(CH_3)_2$C(cyclopentadienyl)(2,7-dimethylfluorenyl)M$(R)_2$;

wherein M is chosen form a group consisting of Zr and Hf, and R is chosen from a group consisting of Cl and $CH_3$. Preferably, the metallocene catalyst is μ-(di-(p-triethylsilylphenyl)methane)(cyclopentadienyl)(2,7-di-t-butylfluorenyl)hafnium dimethyl.

Examples of suitable monocyclopentadienyl metallocenes of the type described in group 2 above disclosed in U.S. Pat. Nos. 5,026,798; 5,057,475; 5,350,723; 5,264,405; 5,055,438 and are described in publication WO 96/002244, all of which are incorporated by reference herein for purposes of U.S. patent practice.

Illustrative, but not limiting, examples of preferred monocyclopentadienyl metallocenes of the type described in group 2, where X=R, are:

μ-$(CH_3)_2$Si(cyclopentadienyl)(1-adamantylamido)M$(R)_2$;
μ-$(CH_3)_2$Si(3-tertbutylcyclopentadienyl)(1-adamantylamido)M$(R)_2$;
μ-$(CH_2$(tetramethylcyclopentadienyl)(1-adamantylamido)M$(R)_2$;
μ-$(CH_3)_2$Si(tetramethylcyclopentadienyl)(1-adamantylamido)M$(R)_2$;
μ-$(CH_3)_2$C(tetramethylcyclopentadienyl)(1-adamantylamido)M$(R)_2$;
μ-$(CH_3)_2$Si(tetramethylcyclopentadienyl)(1-tertbutylamido)M$(R)_2$;
μ-$(CH_3)_2$Si(fluorenyl)(1-tertbutylamido)M$(R)_2$;
μ-$(CH_3)_2$Si(tetramethylcyclopentadienyl)(1-cyclododecylamido)M$(R)_2$; and
μ-$(C_6H_5)_2$C(tetramethylcyclopentadienyl)(1-cyclododecylamido)M$(R)_2$;

wherein M is selected from a group consisting of Ti, Zr, and Hf and wherein R is selected from $C_1$ and $CH_3$.

The first and second metallocene catalyst can be the same or different. In some embodiments, at least one of the first and second metallocene catalyst comprises a transition metal compound that is a bridged bisindenyl metallocene having a formula

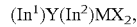

where $In^1$ and $In^2$ are substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal.

In some preferred embodiments (where X=R), at least one of the first and second metallocene catalyst comprises at least one of μ-$(C_6H_5)_2$C(cyclopentadienyl)(fluorenyl)M$(R)_2$, μ-$(C_6H_5)_2$C(3-methylcyclopentadienyl)(fluorenyl)M$(R)_2$, μ-$(CH_3)_2$C(cyclopentadienyl)(fluorenyl)M$(R)_2$, μ-$(C_6H_5)_2$C(cyclopentadienyl)(2-methylindenyl)M$(CH_3)_2$, μ-$(C_6H_5)_2$C(3-methylcyclopentadienyl)(2-methylindenyl)M$(Cl)_2$, μ-$(C_6H_5)_2$C(cyclopentadienyl)(2,7-dimethylfluorenyl)M$(R)_2$ and μ-$(CH_3)_2$C(cyclopentadienyl)(2,7-dimethylfluorenyl)M$(R)_2$; wherein M is chosen form a group consisting of Zr and Hf, and R is chosen from a group consisting of Cl and $CH_3$.

In some preferred embodiments, at least one of the first and second metallocene catalyst comprises at least one of μ-dimethylsilylbis(indenyl)hafniumdimethyl, μ-dimethylsilylbis(indenyl)zirconiumdimethyl, (μ-dimethylsilyl)bis(2-methyl-4-(3,'5'-di-tert-butylphenyl)indenyl)zirconiumdimethyl, (μ-dimethylsilyl)bis(2-methyl-4-(3,'5'-di-tert-butylphenyl)indenyl)hafniumdimethyl, (μ-dimethylsilyl)bis(2-methyl-4-naphthylindenyl)-zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)zirconiumdimethyl, (μ-dimethylsilyl)-bis(2-methyl-4-(N-carbazyl)indenyl)hafniumdimethyl, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)zirconium dichloride, cyclo-propylsilyl bis(2-(methyl)-5,5,8,8-tetramethyl-5,6,7,8-tetrahydrobenz(f)indenyl)-hafnium dimethyl, and μ-(di-(p-triethylsilylphenyl)methane)(cyclopentadienyl)(2,7-di-t-butylfluorenyl)hafnium dimethyl.

Non-coordinating Anions

The term "non-coordinating anion" (NCA) means an anion that either does not coordinate to the transition metal cation or that is only weakly coordinated to the cation thereby remaining sufficiently labile to be displaced by a neutral Lewis base. "Compatible" non-coordinating anions are those that are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge in a +1 state, and yet retain sufficient ability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. NCAs are preferred because of their ability to produce a target molecular weight polymer at a higher temperature than tends to be the case with other activation systems such as alumoxane.

Descriptions of ionic catalysts for coordination polymerization using metallocene cations activated by non-coordinating anions appear in the early work in EP-A-0 277 003; EP-A-0 277 004; WO 92/00333; U.S. Pat. Nos. 5,198,401 and 5,278,119, which are incorporated by reference herein. These references disclose a preferred method of preparation where metallocenes (bisCp and monoCp) are protonated by an anionic precursor such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion are also known. See, e.g., EP-A-0 426 637, EP-A-0 573 403 and U.S. Pat. No. 5,387, 568, which are incorporated by reference herein. Reactive cations other than Bronsted acids capable of ionizing the metallocene compounds include ferrocenium triphenylcarbonium and triethylsilylinium cations. Any metal or metalloid capable of forming a coordination complex that is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic precursors which are initially neutral Lewis acids but form the cation and anion upon ionizing reaction with the metallocene compounds, for example, tris(pentafluorophenyl)boron acts to abstract an alkyl, hydride or silyl ligand to yield a metallocene cation and stabilizing non-coordinating anion. See, e.g., EP-A-0 427 697 and EP-A-0 520 732, which are incorporated by reference herein. Ionic catalysts for addition polymerization can also be prepared by oxidation of the metal centers of transition metal compounds by anionic precursors containing metallic oxidizing groups along with the anion groups. See, e.g., EP-A-0 495 375, which is incorporated by reference herein.

In some embodiments, at least one of the first and second polymerization reaction zones further comprises an activator including, for example, N,N-dimethylanilinium-tetrakis (perfluorophenyl)borate, N,N-dimethylanilinium-tetrakis (perfluoronaphthyl)borate, N,N-dimethylanilinium-tetrakis (perfluorobiphenyl)borate, N,N-dimethylanilinium-tetrakis (3,5-bis(trifluoromethyl)phenyl)borate, triphenylcarbenium-tetrakis(perfluorophenyl)borate, triphenylcarbenium-tetrakis(perfluoronaphthyl)borate, triphenyl-carbenium-tetrakis(perfluorobiphenyl)borate, triphenylcarbenium-tetrakis(3,5-bis(trifluoro-methyl)phenyl)borate, aluminoxanes, alumoxanes, and aluminum alkyls.

Non-Ionic Activators

Where the metal ligands include halide moieties, for example, (methyl-phenyl) silylene (tetra-methyl-cyclopentadienyl) (tert-butyl-amido) zirconium dichloride, which are not capable of ionizing abstraction under standard conditions, they can be converted via known alkylation reactions with organometallic compounds such as lithium or aluminum hydrides or alkyls, alkylalumoxanes, Grignard reagents, etc. See, e.g., EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger its use in excess of that normally stoichiometrically required for alkylation of the metallocene will permit its addition to the reaction solvent with the metallocene compound. Normally, alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Known alkylalumoxanes are additionally suitable as catalyst activators, particularly for those metallocenes comprising halide ligands. The alumoxane component useful as catalyst activator typically is an oligomeric aluminum compound represented by the general formula (R—Al—O) n, which is a cyclic compound, or R(R—Al—O)nAlR$_2$, which is a linear compound. In the general alumoxane formula R is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Application

The polymer composition can be compounded with one or more base oils (or basestocks). The basestock can be or include natural or synthetic oils of lubricating viscosity, whether derived from hydrocracking, hydrogenation, other refining processes, unrefined processes, or re-refined processes. The basestock can be or include used oil. Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils.

In one embodiment, the basestock is or includes a polyalphaolefin (PAO) including a PAO-2, PAO-4, PAO-5, PAO-6, PAO-7 or PAO-8 (the numerical value relating to Kinematic Viscosity at 100° C.). Preferably, the polyalphaolefin is prepared from dodecene and/or decene. Generally, the polyalphaolefin suitable as an oil of lubricating viscosity has a viscosity less than that of a PAO-20 or PAO-30 oil. In one or more embodiments, the basestock can be defined as specified in the American Petroleum Institute (API) Base Oil Interchangeability Guidelines. For example, the basestock can be or include an API Group I, II, III, IV, V oil or mixtures thereof.

In one or more embodiments, the basestock can include oil or compositions thereof conventionally employed as crankcase lubricating oils. For example, suitable basestocks can include crankcase lubricating oils for spark-ignited and compression-ignited internal combustion engines, such as automobile and truck engines, marine and railroad diesel engines, and the like. Suitable basestocks can also include those oils conventionally employed in and/or adapted for use as power transmitting fluids such as automatic transmission fluids, tractor fluids, universal tractor fluids and hydraulic fluids, heavy duty hydraulic fluids, power steering fluids and the like. Suitable basestocks can also be or include gear lubricants, industrial oils, pump oils and other lubricating oils.

In one or more embodiments, the basestock can include not only hydrocarbon oils derived from petroleum, but also include synthetic lubricating oils such as esters of dibasic acids; complex esters made by esterification of monobasic acids, polyglycols, dibasic acids and alcohols; polyolefin oils, etc. Thus, the lubricating oil compositions described can be suitably incorporated into synthetic base oil basestocks such as alkyl esters of dicarboxylic acids, polyglycols and alcohols; polyalpha-olefins; polybutenes; alkyl benzenes; organic esters of phosphoric acids; polysilicone oils;

etc. The lubricating oil composition can also be utilized in a concentrate form, such as from 1 wt % to 49 wt % in oil, e.g., mineral lubricating oil, for ease of handling, and may be prepared in this form by carrying out the reaction of the invention in oil as previously described.

Optionally, one or more conventional additives, such as, for example, pour point depressants, antiwear agents, antioxidants, other viscosity-index improvers, dispersants, corrosion inhibitors, anti-foaming agents, detergents, rust inhibitors, friction modifiers, and the like can be compounded into the basestocks.

Conventional compounding methods are described in U.S. Pat. No. 4,464,493, which is incorporated by reference herein. This conventional process passes the polymer through an extruder at elevated temperature for degradation of the polymer and circulates hot oil across the die face of the extruder while reducing the degraded polymer to particle size upon issuance from the extruder and into the hot oil. The pelletized, solid polymer compositions of the present invention, as described above, can be added by compounding directly with the base oil so as to give directly the viscosity for the VI improver, so that the complex multi-step process of the prior art is not needed. The solid polymer composition can be dissolved in the basestock without the need for additional shearing and degradation processes.

Lubricant oil compounded with the polymer compositions shows reduced or no gelation at lower temperature. Accordingly one aspect of the present disclosure is to provide a method of reducing gelation of lubricant oil and reducing filter plugging when using the lubricant oil.

EXAMPLES

Test Methods

The visual gelation test was carried out as described in U.S. Patent Application Publication No. 2013/0085092, the disclosure of which is incorporated herein by reference. A 40 ml sample of the solution was placed into a 125 ml clear glass vial (or jar) and sealed with a cap. A typical glass vial is available from Fisher Scientific Corporation (cat #: 02-912-345). The glass vial was stored at 10° C. for 8 hours in a low temperature refrigerator maintained at 10° C.+/−3° C. The glass vial was then stored at −15° C.+/−0.5° C. for 16 hours in a freezer. The above temperature conditions were repeated for multiple cycles. One cycle constituted of 8 hours of sample stored at 10° C. followed by 16 hours at −15° C. The glass vial was rated after one and four temperature cycles. A thermocouple was placed into a reference vial, identical to the sample, but containing only the solvent or base oil to monitor the actual sample temperature. The rating of sample was performed immediately after storage at 16 hours at −15° C. in the freezer. During rating, the vial was immediately poured or tilted to almost horizontal position. If condensation formed on the outside of the vial, the condensation was wiped off with a paper towel. The following visual grading was used to rate the sample visually.

| GRADE | DESCRIPTION | DETAILED COMMENTS |
|---|---|---|
| 0 | No gel | Free flowing fluid with mirror surface |
| 1 | Light gel | Slight non-homogeneity, surface roughness |
| 2 | Medium gel | Large non-homogeneity, slight pulling away from vial |
| 3 | Heavy gel | Pulls away from vial, large visible lumps |
| 4 | Solid | Solid gel |

The ethylene content of the first ethylene-α-olefin copolymer (wt % $C_2(R1)$) and the ethylene content of the polymer composition comprising the first and the second ethylene-α-olefin copolymer (wt % $C_2(R2)$) were determined according to ASTM D3900. The ethylene content of the second ethylene-α-olefin copolymer (wt % $C_2(R2)$) was calculated from the measured ethylene contents of the first ethylene-α-olefin copolymer and the overall ethylene content polymer composition (wt % C2(t)) using equation: (PS)*(wt % $C_2(R1)$)+(1−PS)*(wt % $C_2(R2)$)=wt % C2(t), wherein PS is the content of the first ethylene-α-olefin copolymer in the polymer composition.

Melt Flow Rate (MFR) of the first ethylene-α-olefin copolymer and the polymer composition were measured according to ASTM D1238 at 230° C. under a 2.16 kilogram load or a 21.6 kilogram load. Melt Flow Rate of the second ethylene-α-olefin copolymer (MFR(R2)) was calculated from the MFR of first ethylene-α-olefin copolymer (MFR (R1)) and the MFR of the polymer composition (MFR(t)) using equation: (PS)*log(MFR(R1))+(1−PS)*log(MFR (R2))=log(MFR(t)), wherein PS is the content of the first ethylene-α-olefin copolymer in the polymer composition.

The MFRR of the first ethylene-α-olefin copolymer was measured and corrected to a MFR of 4.0 g/10 min and the MFRR of polymer composition were measured and corrected to a MFR of 4.3 g/10 min.

Shear Stability Index (SSI) was determined according to ASTM D6278 at 30 cycles using a Kurt Orbahn diesel injection apparatus.

The yield stress and tan (δ) measurements were carried out as described in U.S. Patent Application Publication No. 2013/0085092, the disclosure of which is incorporated herein by reference. Rheology was performed on 2.4 wt % PAO4 solutions containing the VI improvers (test oil). Oscillatory Rheology Method was used to determine the low temperature performance of the VI improvers.

Oscillatory Rheology Method: Storage Modulus (G'), Loss Modulus (G"), complex viscosity and tan δ (G"/G') were measured at an angular frequency of 1 rad/s applying 0.2 Pa oscillatory stress at a 1° C./min cooling rate from temperature range of 40° C. to −18° C. (cooling step), the sample was then held at −18° C. for about 10 minutes and then re-heated at the same rate of 1° C./min from a temperature of −18° C. to 40° C. (heating step). A δ at the commencement of each heating step and end of the cooling step were calculated as an indicator of polymer-polymer interaction that can lead to gel formation tendency. A higher δ value at −18° C. is preferred for better low temperature performance of the VI improver. A preferred value of δ is greater than 75°. Also, a smaller difference between the δ values at a lower temperature at the end of the cooling step and commencement of the heating step is preferred for smaller gelation tendency.

Thickening efficiency (TE) is a measure of the thickening ability of the polymer in oil, and is defined as: TE=2/c×ln $((kv_{(polymer+oil)})/kv_{oil})/\ln(2)$, where c is the concentration of the polymer and kv is kinematic viscosity at 100° C. according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278. The SSI of a polymer can be calculated from the viscosity of the oil without polymer and the initial and sheared viscosities of the polymer-oil solution using:

$$SSI=100\times(kv_{(polymer+oil),fresh}-kv_{(polymer+oil),sheared})/(kv_{(polymer+oil),fresh}-kv_{oil,fresh}).$$

Example 1

A variety of polymer compositions as described above were synthesized as follows. The polymer compositions of Examples A to D were synthesized in two continuous stirred tank reactors connected in series. The effluent from the first reactor, containing a first copolymer component, unreacted monomers, and solvent, was fed, with additional monomers, to a second reactor where the polymerization was continued to produce a second copolymer component. The polymerization was performed in solution using isohexane as solvent. During the polymerization process, hydrogen addition and temperature control were used to achieve the desired melt flow rate. The catalyst, activated externally to the reactor, was added as needed in amounts effective to maintain the target polymerization temperature.

In the first reactor, the first copolymer component was produced in the presence of ethylene, propylene and a catalyst comprising the reaction product of N,N-dimethylanilinium tetrakis(pentafluorophenyl)boron and [cyclopentadienyl(2,7-di-t-butylfluorenyl)di-p-triethylsilanephenylmethane]hafnium dimethyl.

In the second reactor, the second copolymer component was produced in the presence of ethylene, propylene and a catalyst comprising the reaction product of N,N-dimethylanilinium tetrakis(pentafluorophenyl)boron and [cyclopentadienyl(2,7-di-t-butylfluorenyl)di-p-triethylsilanephenylmethane]hafnium dimethyl.

The mixed copolymer solution emerging from the second reactor was quenched and then devolatilized using conventionally known devolatilization methods such as flashing or liquid phase separation, first by removing the bulk of the isohexane to provide a concentrated solution, and then by stripping the remainder of the solvent in anhydrous conditions using a devolatilizer so as to end up with a molten polymer composition containing less than 0.5 wt % of solvent and other volatiles. The molten polymer composition was advanced by a screw to a pelletizer from which the polymer composition pellets are submerged in water and cooled until solid.

Further details for the processes for making the polymer compositions comprising the first and the second ethylene-α-olefin copolymer are shown in Table 1.

Examples A to D illustrates processes where the two reactors were in series. Examples E to H illustrates a processes where the two reactors were in parallel, that is in Examples E to H, the first and the second ethylene ethylene-α-olefin copolymers each was produced in a continuous stirred tank reactor with the same processing conditions including monomers, solvent, catalyst, separation as those in Examples A to D, but then melt blended to form the polymer composition.

TABLE 1

| | Ex. A | Ex. B | Ex. C | Ex. D | Ex. E | Ex. F | Ex. G | Ex. H |
|---|---|---|---|---|---|---|---|---|
| Reactors line-up | Series | Series | Series | Series | Parallel | Parallel | Parallel | Parallel |
| MFR(R1) (@230° C./2.16 kg) | 5.2 | 4.6 | 9.1 | 4.4 | 5.4 | 5.0 | 4.7 | 6.5 |
| MFR(R2) (@230° C./2.16 kg) | 5.4 | 7.7 | 3.6 | 5.2 | 3.6 | 3.7 | 4.3 | 3.7 |
| wt % C2(R1) | 64.8 | 67.9 | 68.8 | 69.7 | 68.6 | 69.9 | 67.6 | 67.2 |
| wt % C2(R2) | 46.1 | 44.8 | 46.6 | 46.0 | 45.8 | 46.1 | 45.9 | 46.3 |
| PS | 46.5 | 45.4 | 45.1 | 44.9 | 41.4 | 40.6 | 44.9 | 44.5 |
| wt % C2(t) | 54.5 | 54.9 | 56.7 | 56.8 | 55.2 | 55.4 | 55.6 | 55.7 |
| MFR (t) (@230° C./2.16 kg) | 5.3 | 6.1 | 5.5 | 4.8 | 4.0 | 4.0 | 3.8 | 4.4 |
| Polymer MFRR at 4.0 MFR | 31.1 | 31.8 | 33.6 | 32.3 | 33.3 | 33.2 | 33.6 | 33.8 |
| First copolymer MFRR at 4.3 MFR | 32 | 30.9 | 32.9 | 31.3 | 34.8 | 35.1 | 34.7 | 36.3 |
| Reactor Temp (R1), ° C. | 137.5 | 132.0 | 132.0 | 132.0 | 132.0 | 132.0 | 131.9 | 132.1 |
| Reactor Temp (R2), ° C. | 136 | 127.0 | 125.0 | 125.0 | 132.1 | 132.0 | 132.0 | 132.0 |
| $C_2$ Feed Conc. (R1), Wt % | 9.0 | 9.0 | 8.9 | 9.2 | 9.1 | 9.1 | 8.8 | 8.9 |
| $C_3$ Feed Conc. (R1), Wt % | 6.0 | 5.0 | 4.5 | 4.3 | 4.2 | 4.2 | 4.6 | 4.6 |
| $C_2$ Feed Conc. (R2), Wt % | 9.3 | 6.3 | 6.4 | 6.2 | 7.3 | 7.3 | 7.4 | 7.4 |
| $C_3$ Feed Conc. (R2), Wt % | 20.9 | 11.6 | 11.5 | 11.9 | 13.5 | 13.5 | 12.9 | 12.9 |
| TE | 1.93 | 1.86 | 1.86 | 1.93 | 1.95 | 1.97 | 1.97 | 1.92 |
| SSI-LPTL, % | 27.4 | 23.3 | 24.6 | 25.3 | 26.0 | 27.0 | 26.7 | 25.3 |
| CCS, cP | 8833 | 8637 | 8590 | 8422 | 8462 | 8447 | 8557 | 8668 |
| Gel Rating (4 cycles) | 0 | 0 | 0 | 0 | 1 | 1 | 1 | 1 |
| δ at −18° C. (commencement of heating step) | 89 | 78 | 86 | 88 | 73 | 74 | 67 | 71 |
| δ at −18° C. (end of cooling step) | 90 | 85 | 88 | 89 | 79 | 79 | 81 | 87 |

As illustrated in Table 1, Examples A to D, in which the polymer compositions were prepared in two reactors in series, resulted in gel rating of 0, whereas Examples E to H, in which the polymer compositions were prepared in two reactors in parallel, resulted in gel rating of 1.

As illustrated in Table 1, Examples A to D, in which the polymer compositions were prepared in two reactors in series, resulted in δ at −18° C., the commencement of the heating step, of greater than 75°, whereas Examples E to H, in which the polymer compositions were prepared in two reactors in parallel, resulted in δ at −18° C., the commencement of the heating step, of less than 75°.

Further as seen in Table 1, Examples A to D resulted in a smaller difference in the δ values (i.e., Δδ) at −18° C. between the end of cooling step and the commencement of heating step, compared to Examples E to H, which resulted in a greater Δδ.

Example 2

A variety of ethylene-propylene polymer compositions were synthesized in series polymerization reactors as described above with reference to Example 1. The polymer compositions were tested for filter plugging. In the filter plugging test, the polymer compositions were blended with fully formulated 15W40 motor oil, which was then pumped at 0° C. at 4 gallons per minute through a Caterpillar 257-9344 filter. The pressure at the filter was measured at time zero and after ten minutes to determine a change in pressure (ΔP), which is reported in Table 2.

TABLE 2

| Example | R1 MFR (g/10 minutes) | R1 Mw | ΔP at 10 minutes (psi) |
|---|---|---|---|
| Ex. I | 16.8 | 64998 | 40 |
| Ex. J | 18.8 | 63813 | 43 |
| Ex. K | 16.5 | 65106 | 41 |
| Ex. L | 15.5 | 64959 | 43 |
| Ex. M | 13.5 | — | 49 |
| Ex. N | 14 | 67192 | 43 |
| Ex. O | 1.9 | — | 90 |
| Ex. P | 2.4 | — | 125 |
| Ex. Q | 1.9 | — | 135 |
| Ex R | 4 | — | 145 |
| Ex. S | 9.4 | — | >100 |
| Ex. T | 10.3 | — | 100 |
| Ex. U | 12.6 | — | 54 |

As seen in Table 2, the examples with a first reactor component that had a MFR of greater than 13 g/10 minute (Examples I to N) exhibited decreased filter plugging with a ΔP of less than 50 psi after 10 minutes. In comparison, the examples that had a first reactor MFR of less than 13 g/10 min (Examples O to U) exhibited increased filter plugging with a ΔP of greater than 50 psi after 10 minutes.

Example 3

A variety of ethylene-propylene polymer compositions were synthesized in series polymerization reactors as described above with reference to Example 1. The properties of the ethylene-propylene polymer compositions are shown below in Table 3.

TABLE 3

| Example | Antioxidant (Irganox 1076) Content (ppm) | Overall Ethylene Content (wt %) | R1 Ethylene Content (wt %) | R1 MFR (g/10 min) | R2 MFR (g/10 min) | SSI | TE |
|---|---|---|---|---|---|---|---|
| Ex. AA | Not measured | Not measured | 70.86 | 19.56 | Not measured | Not measured | Not measured |
| Ex. AB | 969 | 56.87 | 70.99 | 19.38 | 3.73 | 24.30 | 1.89 |
| Ex. AC | 1027 | 56.68 | 70.04 | 17.08 | 3.71 | 24.38 | 1.89 |
| Ex. AD | 1076 | 56.54 | 71.58 | 13.93 | 3.97 | 24.52 | 1.89 |
| Ex. BA | 923 | 57.93 | Not measured | Not measured | 2.81 | 25.62 | 1.95 |
| Ex. BB | Not measured | Not measured | 71.77 | 14.80 | Not measured | Not measured | Not measured |
| Ex. BC | 998 | 56.69 | 69.61 | 15.83 | 2.66 | 26.39 | 1.96 |
| Ex. CA | 1111 | 58.11 | 71.27 | 17.92 | 3.41 | 24.25 | 1.90 |
| Ex. CB | 1143 | 58.06 | 72.09 | 15.44 | 3.16 | 24.26 | 1.90 |
| Ex. CC | 1027 | 58.43 | 71.51 | 16.14 | 2.92 | 25.18 | 1.94 |
| Ex. CD | 1013 | 58.03 | 71.95 | 15.80 | 2.81 | 25.19 | 1.93 |

The degree of crystallinity of the overall polymer composition was measured at 25° C., 75° C., and at 5° C. using x-ray diffraction, as described below, with the results shown in Table 4.

In the examples herein, the x-ray detector used was a Mar345 Image Plate Detector (with an image plate diameter of 345 mm) The x-ray source used was a Rigaku Rotating Anode X-ray Generator Model RA-HF18, with a CuKα, Wavelength of 1.542 Å, that operated at 55 kV, 50 mA, and a vacuum of 29 InHg (736 torr). The detector was set up in a WAXS configuration with two low scatter slits, with slit 1 (S1) having an aperture size of 1.5 mm vertical and 1.7 mm horizontal, and slit 2 (S2) having an aperture size of 1.1 mm vertical and 1.0 mm horizontal. The polymer composition samples were contained by a steel washer having Kapton windows (0.003 in thickness) on both sides of the sample. The polymer samples had a 0.053 in thickness and 0.23 in diameter. For the x-ray diffraction test the following temperature profiles were used. Profile 1: the temperature of the sample was raised from room temperature (22.8° C.) to 150° C. at 75° C./minute, where it was held for 15 minutes, the sample was then cooled from 150° C. to 5° C. at 150° C./minute and held for 60 minutes where a 15-minute image at 5° C. was taken. Profile 2: the sample temperature was then increased from 5° C. to 25° C. at 10° C./minute and held for 60 minutes, after which a 15-minute image was taken at 25° C. Profile 3: the sample temperature was then raised from 25° C. to 70° C. at 10° C./minute and held for 60 minutes, after which a 15-minute image was taken at 70° C. Profile 4: the sample temperature was then increased from 70° C. to 150° C. at 75° C./minute and held for 15 minutes and then the sample was cooled from 150° C. to 25° C. at 150° C./minute at which it was held for 60 minutes, after which a second 15-minute image was taken at 25° C. For each sample an initial image (Io) was taken of the empty sample holder, and an initial image (It) was taken of the sample at room temperature.

The percent crystallinity of each sample was then calculated by comparing the scattering intensity of crystalline peaks to the total scattering intensity. In particular the data processed from the test was analyzed as follows: (1) In xPolar, calibrate centers and sample-to-detector distance for all 2D WAXS image using the NIST silicon standard; (2) In xPolar, reduce background for 2D WAXS images using the background image taken with an empty sample holder (steel washer and Kapton window) and the transmission coefficient as a scaling factor; (3) In xPolar, obtain an 1D average WAXS curve by integrating the 2D WAXS image in the azimuthal direction along the radius and output the intensity vs. 2theta data to Origin; and (4) Evaluate the scattering intensity by fitting all crystalline and amorphous peaks and calculating the area of each fitted peak in Origin. The % crystallinity is determined by dividing the sum of the area of all crystalline peaks by the total area under the 1D average WAXS curve of the sample.

As seen in Table 4, at both 25° C. and 75° C. there was no measurable amount of crystallinity detected in the polymer samples. At 5° C. the three samples exhibited crystallinity but the degree of crystallinity was ambiguous as there was no discernable diffraction peak present. In an effort to determine the degree of crystallinity at 5° C., the curve was deconvoluted into two peaks using a Voigt model.

TABLE 4

Degree of Crystallinity Measurements

| Example | Crystallinity at 25° C. | Crystallinity at 70° C. | Crystallinity at 5° C. |
|---|---|---|---|
| Ex. AD | Not detected | Not detected | 7% |
| Ex. BC | Not detected | Not detected | 8% |
| Ex. CB | Not detected | Not detected | 4% |

A further test was conducted to measure the degree of crystallinity of the R1 component of the sample from Example AD. The R1 component did not exhibit any measurable degree of crystallinity, as shown in Table 5 below.

TABLE 5

R1 Degree of Crystallinity Measurement

| Sample (lot) | Crystallinity at 25° C. |
|---|---|
| R1 Component of Ex. AD | Not detected |

As the polymer compositions were made in series reactors, and the R2 component is made in the second series reactor, the properties of the R2 component cannot be directly measured. However, as the overall crystallinity of polymer samples and the crystallinity of the R1 component were shown to have less than 15% crystallinity, the R2 component would also have less than 15% crystallinity.

Exemplary embodiments of the present disclosure include the following enumerated embodiments.

Embodiment A: A method of making a polymer composition, comprising the steps of:

(i) feeding a first ethylene monomer, a first propylene monomer, a first solvent, and a first metallocene catalyst to a first reactor to form a first effluent comprising a first ethylene-propylene copolymer, where the first ethylene-propylene copolymer comprises from about 60 wt % to about 85 wt % ethylene-derived units and from about 15 wt % to about 40 wt % propylene-derived units, and where the first ethylene-propylene copolymer has a MFR of greater than 10 g/10 min;

(ii) feeding the first effluent from the first reactor, a second ethylene monomer, a second propylene comonomer, a second solvent, and optionally a second metallocene catalyst to a second reactor to form a second effluent comprising the first ethylene-propylene copolymer and a second ethylene-propylene copolymer, where the second ethylene-propylene copolymer comprises from about 40 wt % to about 60 wt % ethylene-derived units and from 40 wt % to about 60 wt % propylene-derived units;

(iii) devolatizing the second effluent to form a concentrated polymer stream comprising a molten polymer composition and less than 1 wt % solvent; and (iv) pelletizing the molten polymer composition to form the polymer composition, where the polymer composition comprises from about 35 wt % to about 50 wt % of the first ethylene-propylene copolymer and from about 50 wt % to about 65 wt % of the second ethylene-propylene copolymer, and where the polymer composition comprises 50 wt % to 70 wt % ethylene-derived units.

Embodiment B: The method of Embodiment A, wherein the first and the second metallocene catalysts comprise one of, or a mixture of, cyclopentadienyl complexes having one or two cyclopentadienyl rings.

Embodiment C: The method of Embodiment A or B, wherein the first reactor and the second reactor are continuous flow stirred tank reactors.

Embodiment D: The method of any one of Embodiments A to C, wherein the first ethylene-propylene copolymer comprises from about 65 wt % to about 75 wt % ethylene-derived units and from about 25 wt % to about 35 wt % propylene-derived units.

Embodiment E: The method of any one of Embodiments A to D, wherein the first ethylene-propylene copolymer comprises from about 67 wt % to about 73 wt % ethylene-derived units and from about 27 wt % to about 33 wt % propylene-derived units.

Embodiment F: The method of any one of Embodiments A to E, wherein the second ethylene-propylene copolymer comprises from about 40 wt % to about 50 wt % ethylene-derived units and from about 50 wt % to about 60 wt % propylene-derived units.

Embodiment G: The method of any one of Embodiments A to F, wherein the second ethylene-propylene copolymer comprises from about 43 wt % to about 49 wt % ethylene-derived units and from about 51 wt % to about 57 wt % propylene-derived units.

Embodiment H: The method of any one of Embodiments A to G, wherein the polymer composition comprises from about 40 wt % to about 50 wt % of the first ethylene-propylene copolymer and from about 50 wt % to about 60 wt % of the second ethylene-propylene copolymer.

Embodiment I: The method of any one of Embodiments A to H, wherein the polymer composition comprises from about 43 wt % to about 47 wt % of the first ethylene-propylene copolymer and about 53 wt % to about 57 wt % of the second ethylene-propylene copolymer.

Embodiment J: The method of any one of Embodiments A to I, wherein the first ethylene-propylene copolymer has an MFR of from greater than 10 g/10 min to less than 30 g/10 min.

Embodiment K: The method of any one of Embodiments A to J, wherein the first ethylene-propylene copolymer has an MFR of from about 12 g/10 min to about 25 g/10 min.

Embodiment L: The method of any one of Embodiments A to K, wherein the second ethylene-propylene copolymer has an MFR of at least 2 g/10 min.

Embodiment M: The method of any one of Embodiments A to L, wherein the second ethylene copolymer has an MFR of from about 2 g/10 min to about 10 g/10 min.

Embodiment N: The method of any one of Embodiments A to M, wherein the polymer composition has an MFR of from about 3 g/10 min to about 15 g/10 min.

Embodiment O: The method of any one of Embodiments A to N, wherein the polymer composition has an MFR of from about 5 g/10 min to about 10 g/10 min.

Embodiment P: The method of any one of Embodiments A to O, wherein the first ethylene-propylene copolymer has a weight-average molecular weight (Mw) of less than about 70,000.

Embodiment Q: The method of any one of Embodiments A to P, wherein the first ethylene-propylene copolymer has a weight-average molecular weight (Mw) of from about 60,000 to about 70,000.

Embodiment R: The method of any one of Embodiments A to Q, wherein the second ethylene-propylene copolymer has a weight-average molecular weight (Mw) of less than 130,000.

Embodiment S: The method of any one of Embodiments A to R, wherein the second ethylene-propylene copolymer has a weight-average molecular weight (Mw) of from about 100,000 to about 130,000.

Embodiment T: The method of any one of Embodiments A to S, wherein the polymer composition has a weight-average molecular weight (Mw) of less than 100,000.

Embodiment U: The method of any one of Embodiments A to T, wherein the polymer composition has a weight-average molecular weight (Mw) of from about 75,000 to about 100,000.

Embodiment V: The method of any one of Embodiments A to U, wherein the first ethylene-propylene copolymer has a crystallinity at 25° C. of less than 5%.

Embodiment W: The method of any one of Embodiments A to V, wherein the first ethylene-propylene copolymer exhibits no discernable crystallinity at 25° C.

Embodiment X: The method of any one of Embodiments A to W, wherein the polymer composition has a crystallinity at 25° C. of less than 5%.

Embodiment Y: The method of any one of Embodiments A to X, wherein the polymer composition exhibits no discernable crystallinity at 25° C.

Embodiment Z: The method of any one of Embodiments A to Y, wherein a lubricant composition comprising the polymer composition has a SSI of from about 20 to about 30.

Embodiment AA: The method of any one of Embodiments A to Z, wherein a lubricant composition comprising the polymer composition has a TE of less than 3.

Embodiment AB: The method of any one of Embodiments A to AA, wherein a PAO solution at 2.4 wt % concentration of the polymer composition has a δ at the commencement of the heating step of greater than about 75°, evaluated at an angular frequency of 1 rad/s applying 0.2 Pa oscillatory stress at 1° C./min heating rate during the temperature from −18° C. to 40° C., where the tan δ is a ratio of Loss Modulus to Storage Modulus.

Embodiment AC: The method of any one of Embodiments A to AB, wherein a PAO solution at 2.4 wt % concentration of the polymer composition has a δ at the end of the cooling step of greater than about 75°, evaluated at an angular frequency of 1 rad/s applying 0.2 Pa oscillatory stress at 1° C./min cooling rate during the temperature from 40° C. to −18° C., where the tan δ is a ratio of Loss Modulus to Storage Modulus.

Embodiment AD: A polymer composition produced by the method of any one of Embodiments A to AC.

Embodiment AE: A polymer composition comprising
(a) a first ethylene-propylene copolymer comprising from about 60 wt % to about 85 wt % ethylene-derived units and from about 15 wt % to about 40 wt % propylene-derived units, wherein the first ethylene-propylene copolymer has an MFR of greater than 10 g/10 min, a weight-average molecular weight (Mw) of less than about 70,000, and a crystallinity at 25° C. of less than 5%; and
(b) a second ethylene-propylene copolymer comprising from about 40 wt % to about 60 wt % ethylene-derived units and from about 40 wt % to about 60 wt % propylene-derived units, wherein the second ethylene-propylene copolymer has an MFR of at least 2 g/10 min, a weight-average molecular weight (Mw) of less than 130,000, and a crystallinity at 25° C. of less than 5%;
wherein the polymer composition comprises from about 35 wt % to about 50 wt % of the first ethylene-propylene copolymer and about 50 wt % to about 65 wt % of the second ethylene-propylene copolymer; and
wherein the polymer composition comprises from about 50 wt % to about 70 wt % ethylene-derived units.

Embodiment AF: The method of Embodiment AE, wherein the first ethylene-propylene copolymer comprises from about 65 wt % to about 75 wt % ethylene-derived units and from about 25 wt % to about 35 wt % propylene-derived units.

Embodiment AG: The method of Embodiment AE or AF, wherein the first ethylene-propylene copolymer comprises from about 67 wt % to about 73 wt % ethylene-derived units and from about 27 wt % to about 33 wt % propylene-derived units.

Embodiment AH: The method of any one of Embodiments AE to AG, wherein the second ethylene-propylene copolymer comprises from about 40 wt % to about 50 wt % ethylene-derived units and from about 50 wt % to about 60 wt % propylene-derived units.

Embodiment AI: The method of any one of Embodiments AE to AH, wherein the second ethylene-propylene copolymer comprises from about 43 wt % to about 49 wt % ethylene-derived units and from about 51 wt % to about 57 wt % propylene-derived units.

Embodiment AJ: The method of any one of Embodiments AE to AI, wherein the polymer composition comprises from about 40 wt % to about 50 wt % of the first ethylene-propylene copolymer and from about 50 wt % to about 60 wt % of the second ethylene-propylene copolymer.

Embodiment AK: The method of any one of Embodiments AE to AJ, wherein the polymer composition comprises from about 43 wt % to about 47 wt % of the first ethylene-propylene copolymer and about 53 wt % to about 57 wt % of the second ethylene-propylene copolymer.

Embodiment AL: The method of any one of Embodiments AE to AK, wherein the first ethylene-propylene copolymer has an MFR of from greater than 10 g/10 min to less than 30 g/10 min.

Embodiment AM: The method of any one of Embodiments AE to AL, wherein the first ethylene-propylene copolymer has an MFR of from about 12 g/10 min to about 25 g/10 min.

Embodiment AN: The method of any one of Embodiments AE to AM, wherein the second ethylene copolymer has an MFR of from about 2 g/10 min to about 10 g/10 min.

Embodiment AO: The method of any one of Embodiments AE to AN, wherein the polymer composition has an MFR of from about 3 g/10 min to about 15 g/10 min.

Embodiment AP: The method of any one of Embodiments AE to AO, wherein the polymer composition has an MFR of from about 5 g/10 min to about 10 g/10 min.

Embodiment AQ: The method of any one of Embodiments AE to AP, wherein the first ethylene-propylene copolymer has a weight-average molecular weight (Mw) of from about 60,000 to about 70,000.

Embodiment AR: The method of any one of Embodiments AE to AQ, wherein the second ethylene-propylene copolymer has a weight-average molecular weight (Mw) of from about 100,000 to about 130,000.

Embodiment AS: The method of any one of Embodiments AE to AR, wherein the polymer composition has a weight-average molecular weight (Mw) of less than 100,000.

Embodiment AT: The method of any one of Embodiments AE to AS, wherein the polymer composition has a weight-average molecular weight (Mw) of from about 75,000 to about 100,000.

Embodiment AU: The method of any one of Embodiments AE to AT, wherein the first ethylene-propylene copolymer exhibits no discernable crystallinity at 25° C.

Embodiment AV: The method of any one of Embodiments AE to AU, wherein the polymer composition exhibits no discernable crystallinity at 25° C.

Embodiment AW: The method of any one of Embodiments AE to AV, wherein a lubricant composition comprising the polymer composition has a SSI of from about 20 to about 30.

Embodiment AX: The method of any one of Embodiments AE to AW, wherein a lubricant composition comprising the polymer composition has a TE of less than 3.

Embodiment AY: The method of any one of Embodiments AE to AX, wherein a PAO solution at 2.4 wt % concentration of the polymer composition has a δ at the commencement of the heating step of greater than about 75°, evaluated at an angular frequency of 1 rad/s applying 0.2 Pa oscillatory stress at 1° C./min heating rate during the temperature from −18° C. to 40° C., where the tan δ is a ratio of Loss Modulus to Storage Modulus.

Embodiment AZ: The method of any one of Embodiments AE to AY, wherein a PAO solution at 2.4 wt % concentration of the polymer composition has a δ at the end of the cooling step of greater than about 75°, evaluated at an angular frequency of 1 rad/s applying 0.2 Pa oscillatory stress at 1° C./min cooling rate during the temperature from 40° C. to −18° C., where the tan δ is a ratio of Loss Modulus to Storage Modulus.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

Certain embodiments and features have been described using a set of numerical upper limits and a set of numerical lower limits. It should be appreciated that ranges from any lower limit to any upper limit are contemplated unless otherwise indicated. All numerical values take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the invention may be devised without departing from the basic scope thereof, and the scope thereof is determined by the claims that follow.

We claim:

1. A method of making a polymer composition, comprising the steps of:
   (i) feeding a first ethylene monomer, a first propylene monomer, a first solvent, and a first metallocene catalyst to a first reactor to form a first effluent comprising a first ethylene-propylene copolymer which exhibits no discernable crystallinity at 25° C. (as measured by x-ray diffraction), wherein the first ethylene-propylene copolymer comprises from about 67 wt % to about 73 wt % ethylene-derived units and from about 27 wt % to about 33 wt % propylene-derived units, and wherein the first ethylene-propylene copolymer has a MFR of greater than 13 g/10 min;
   (ii) feeding the first effluent from the first reactor, a second ethylene monomer, a second propylene comonomer, a second solvent, and optionally a second metallocene catalyst to a second reactor to form a second effluent comprising the first ethylene-propylene copolymer and a second ethylene-propylene copolymer which exhibits no discernable crystallinity at 25° C. (as measured by x-ray diffraction), wherein the second ethylene-propylene copolymer comprises from about 43 wt % to about 49 wt % ethylene-derived units and from about 51 wt % to about 57 wt % propylene-derived units;
   (iii) devolatizing the second effluent to form a concentrated polymer stream comprising a molten polymer composition and less than 1 wt % solvent; and
   (iv) pelletizing the molten polymer composition to form the polymer composition which exhibits no discernable crystallinity at 25° C. (as measured by x-ray diffraction), wherein the polymer composition comprises from about 43 wt % to about 47 wt % of the first ethylene-propylene copolymer and about 53 wt % to about 57 wt % of the second ethylene-propylene copolymer, and wherein the polymer composition comprises 50 wt % to 60 wt % ethylene-derived units.

2. The method of claim 1, wherein the first and the second metallocene catalysts comprise one of, or a mixture of, cyclopentadienyl complexes having one or two cyclopentadienyl rings.

3. The method of claim 1, wherein the first reactor and the second reactor are continuous flow stirred tank reactors.

4. The method of claim 1, wherein the polymer composition comprises from about 40 wt % to about 50 wt % of the first ethylene-propylene copolymer and from about 50 wt % to about 60 wt % of the second ethylene-propylene copolymer.

5. The method of claim 1, wherein the second ethylene-propylene copolymer has an MFR of at least 2 g/10 min.

6. The method of claim 1, wherein the polymer composition has an MFR of from about 3 g/10 min to about 15 g/10 min.

7. The method of claim 1, wherein the first ethylene-propylene copolymer has a weight-average molecular weight (Mw) of less than about 70,000.

8. The method of claim 1, wherein the second ethylene-propylene copolymer has a weight-average molecular weight (Mw) of less than 130,000.

9. The method of claim 1, wherein the polymer composition has a weight-average molecular weight (Mw) of less than 100,000.

10. The method of claim 1, wherein a lubricant composition comprising the polymer composition has a SSI of from about 20 to about 30.

11. The method of claim 1, wherein a lubricant composition comprising the polymer composition has a TE of less than 3.

12. The method of claim 1, wherein a PAO solution at 2.4 wt % concentration of the polymer composition has a δ at the commencement of the heating step of greater than about 75°, evaluated at an angular frequency of 1 rad/s applying 0.2 Pa oscillatory stress at 1° C/min heating rate during the temperature from −18° C. to 40° C., where the tan δ is a ratio of Loss Modulus to Storage Modulus.

13. The method of claim 1, wherein a PAO solution at 2.4 wt % concentration of the polymer composition has a δ at the end of the cooling step of greater than about 75°, evaluated at an angular frequency of 1 rad/s applying 0.2 Pa oscillatory stress at 1° C./min cooling rate during the temperature from 40° C. to −18° C., where the tan δ is a ratio of Loss Modulus to Storage Modulus.

14. A polymer composition produced by the method of claim 1.

15. A polymer composition comprising
(a) a first ethylene-propylene copolymer comprising from about 67 wt % to about 73 wt % ethylene-derived units and from about 27 wt % to about 33 wt % propylene-derived units, wherein the first ethylene-propylene copolymer has an MFR of greater than 13 g/10 min, a weight-average molecular weight (Mw) of less than about 70,000, and no discernable crystallinity at 25° C. (as measured by x-ray diffraction); and
(b) a second ethylene-propylene copolymer comprising from about 43 wt % to about 49 wt % ethylene-derived units and from about 51 wt % to about 57 wt % propylene-derived units, wherein the second ethylene-propylene copolymer has an MFR of at least 2 g/10 min, a weight-average molecular weight (Mw) of less than 130,000, and no discernable crystallinity at 25° C. (as measured by x-ray diffraction);
wherein the polymer composition comprises from about 43 wt % to about 47 wt % of the first ethylene-propylene copolymer and about 53 wt % to about 57 wt % of the second ethylene-propylene copolymer; and
wherein the polymer composition exhibits no discernable crystallinity at 25° C. (as measured by x-ray diffraction) and comprises from about 50 wt % to about 60 wt % ethylene-derived units.

16. The method of claim 15, wherein the first ethylene-propylene copolymer has an MFR of from greater than 13 g/10 min to less than 30 g/10 min.

17. The method of claim 15, wherein the second ethylene copolymer has an MFR of from about 2 g/10 min to about 10 g/10 min.

* * * * *